(12) United States Patent  (10) Patent No.: US 8,105,020 B2
Bywater et al.  (45) Date of Patent: Jan. 31, 2012

(54) TURBOCHARGER

(75) Inventors: John Michael Bywater, Huddersfield (GB); Stephen Garrett, Huddersfield (GB); Henry David Lambton Carr, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 12/630,751

(22) Filed: Dec. 3, 2009

(65) Prior Publication Data

US 2010/0143099 A1 Jun. 10, 2010

Related U.S. Application Data

(63) Continuation of application No. PCT/GB2008/001791, filed on May 27, 2008.

(30) Foreign Application Priority Data

Jun. 5, 2007 (GB) .................................. 0710670.1

(51) Int. Cl.
*F01D 17/16* (2006.01)
(52) U.S. Cl. ........................................................ 415/160
(58) Field of Classification Search .................. 415/160, 415/164, 165, 157
See application file for complete search history.

(56) References Cited

U.S. PATENT DOCUMENTS 2,739,782 A 3/1956 White
3,160,392 A 12/1964 Hunter
4,174,617 A * 11/1979 Jalali-Karchay ................ 60/602
4,291,535 A * 9/1981 Goloff ............................ 60/602
4,403,914 A 9/1983 Rogo et al.
4,544,325 A 10/1985 Rogo et al.
4,953,110 A * 8/1990 Chartrand ..................... 701/101

(Continued)

FOREIGN PATENT DOCUMENTS

GB 2 392 956 3/2004

(Continued)

OTHER PUBLICATIONS

International Search Report, PCT/GB2008/001791, Apr. 17, 2009, Cummins Turbo Technologies, Limited.

(Continued)

*Primary Examiner* — Ninh H Nguyen
(74) *Attorney, Agent, or Firm* — Krieg DeVault LLP; Matthew D. Fair, Esq.

(57) ABSTRACT

A turbocharger comprises a turbine wheel (5) mounted within a housing assembly (1, 3) for rotation about a turbine axis, a gas flow inlet passage (8) upstream of the turbine wheel (5), and a gas flow control mechanism (10, 16, 32) located within the housing assembly (1, 3) upstream of the turbine wheel (5) and operable to control gas flow through said gas flow inlet passage (9). An actuator assembly is mounted to the housing assembly and comprises: A lead screw including a lead screw shaft (37) defining a lead screw axis, and a lead screw nut (36) threadedly engaged on a threaded portion of the lead screw shaft (37). The lead screw (36, 37) being arranged so that rotation of one of said shaft and nut relative to the housing assembly produces linear movement in the other of said shaft and nut in the direction of the lead screw axis: The lead screw (36, 37) engages the gas flow control mechanism (10, 16, 32) at a location within a housing cavity defined within said housing assembly (1, 3).

18 Claims, 11 Drawing Sheets

U.S. PATENT DOCUMENTS 5,522,697 A * 6/1996 Parker et al. .................. 415/158
5,701,741 A 12/1997 Halsall
5,868,552 A 2/1999 McKean et al.

FOREIGN PATENT DOCUMENTS

WO    WO 02/062604    8/2002
WO    WO 2006/061588    6/2006

OTHER PUBLICATIONS

UK Intellectual Property Office Search Report for Application No. GB0710670.1 issued Sep. 12, 2007, Cummins Turbo Technologies, Limited.

* cited by examiner

TURBOCHARGER

CROSS REFERENCE TO RELATED APPLICATIONS

The present application is a continuation of PCT/GB2008/001791 filed May 27, 2008, which claims the benefit of United Kingdom Patent Application No. 0710670.1 filed Jun. 5, 2007, each of which are incorporated herein by reference.

The present invention relates to a turbocharger with a gas flow control mechanism. Particularly, but not exclusively, the present invention relates to variable geometry turbochargers, and more particularly to an actuating assembly for a variable geometry mechanism of a variable geometry turbocharger.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; an annular inlet passageway defined between facing radial walls arranged around the turbine chamber; an inlet volute arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

In one known type of variable geometry turbine, an axially moveable wall member, generally referred to as a "nozzle ring", defines one wall of the inlet passageway. The position of the nozzle ring relative to a facing wall of the inlet passageway is adjustable to control the axial width of the inlet passageway. Thus, for example, as gas flow through the turbine decreases, the inlet passageway width may be decreased to maintain gas velocity and optimise turbine output.

The nozzle ring may be provided with vanes which extend into the inlet and through slots provided in a "shroud" defining the facing wall of the inlet passageway to accommodate movement of the nozzle ring. Alternatively vanes may extend from the fixed facing wall and through slots provided in the nozzle ring.

Typically the nozzle ring may comprise a radially extending wall (defining one wall of the inlet passageway) and radially inner and outer axially extending walls or flanges which extend into an annular cavity behind the radial face of the nozzle ring. The cavity is formed in a part of the turbocharger housing (usually either the turbine housing or the turbocharger bearing housing) and accommodates axial movement of the nozzle ring. The flanges may be sealed with respect to the cavity walls to reduce or prevent leakage flow around the back of the nozzle ring. In one common arrangement the nozzle ring is supported on rods extending parallel to the axis of rotation of the turbine wheel and is moved by an actuator assembly which axially displaces the rods.

An example of such a known actuator assembly is disclosed in U.S. Pat. No. 5,868,552. A yoke is pivotally supported within the bearing housing and defines two arms, each of which extends into engagement with a respective nozzle ring support rod. The yoke is mounted on a shaft journaled in the bearing housing and supporting a crank external to the bearing housing which may be connected to an actuator in any appropriate manner. Each arm of the yoke engages a respective support rod via a block which is pivotally mounted to the end of the yoke on a pin and which is received in a slot defined by the rod which restrains the block from movement along the axis of the rod but allows movement perpendicular to the axis of the rod. An actuator is controlled to pivot the yoke about its support shaft via the yoke crank which in turn causes ends of the yoke arms to describe an arc of a circle. Engagement of the yoke arms with the nozzle ring support rods moves the rods back and forth along their axis. Off axis movement of the yoke arms is accommodated by the sliding motion of the blocks within the slots defined by support rods.

The actuator which moves the yoke can take a variety of forms, including pneumatic, hydraulic and electric and can be linked to the yoke in a variety of ways. The actuator will generally adjust the position of the nozzle ring under the control of an engine control unit (ECU) in order to modify the airflow through the turbine to meet performance requirements.

It is an object of the present invention to provide an improved actuator assembly for controlling the position of a gas flow control mechanism such as for instance the variable geometry mechanism of a variable geometry turbine.

According to the present invention there is provided a turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising: a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis; wherein the lead screw engages the gas flow control mechanism at a location within a housing cavity defined within said housing assembly.

With the present invention the engagement between the lead screw and the gas flow control mechanism is internal to the turbocharger housing, which reduces the space requirement of the turbocharger as a whole. In addition, the housing assembly provides protection from dirt and contamination present in the environment external to the turbocharger.

In a preferred embodiment of the invention the cavity within which the lead screw engages the gas flow control mechanism is defined within the turbocharger bearing housing and receives an oil supply for lubrication. Accordingly the cavity may be an oil supply/drain cavity defined within a turbocharger bearing housing located between a turbine housing and a compressor housing and within which turbocharger shaft bearings are provided. With such an embodiment portions of the lead screw located within the cavity are lubricated by the same oil supply provided to lubricate the turbocharger shaft bearings.

For instance, the turbine wheel may be mounted on a turbocharger shaft which extends from the turbine housing through the bearing housing to the compressor housing, the turbine shaft being journalled on bearings located within the bearing housing, said bearings being located within said housing cavity and lubricated by the oil supply.

A motor is preferably provided to rotate one of the lead screw shaft and lead screw nut to produce linear motion in the other of the lead screw shaft and lead screw nut.

The motor may typically be an electric DC motor, stepper motor or inductance motor but other forms of appropriate motor will be apparent to the skilled person.

The motor may be mounted external to the housing assembly, for instance within a motor housing mounted to the turbine housing assembly. In one embodiment the motor or motor housing is mounted to an external wall of the bearing housing assembly which defines part of said cavity. The housing assembly wall may have an aperture into or through which the lead screw shaft or a motor shaft extends.

The motor may have a motor shaft connected to the lead screw shaft or lead screw nut by gears located in a gear housing which is integral with or connected to the motor housing and mounted to the housing assembly. The motor housing and/or gear housing may be removably secured to the housing assembly.

The gas flow control mechanism may be one of various different types of mechanism. For instance the gas flow control mechanism may be a variable geometry mechanism provided to control the size of the gas flow inlet to the turbine wheel. In one embodiment of the invention the variable geometry mechanism comprises a movable nozzle ring of the type described above. However, the invention may be applicable to other types of variable geometry mechanism including swing vane mechanisms comprising an annular array of adjustable guide vanes. Moreover, the invention could be applied to other forms of gas control mechanism such as a wastegate valve.

In one embodiment of the invention said inlet passage is annular and surrounds the turbine wheel, and said variable geometry mechanism includes an annular wall member which is displaceable in a direction parallel to the turbine axis to vary the width of the annular inlet passage between a first surface defined by the annular wall member and a second surface defined by the housing assembly. The annular wall member may be displaceable within a side wall cavity defined by the housing assembly and may be sealed against communication with the housing cavity.

The lead screw may engage the gas flow control mechanism directly, or via a linkage provided between the lead screw and the gas flow control mechanism. The linkage may include a link member located within the housing cavity.

In one embodiment the linkage comprises at least one axially displaceable rod on which the movable wall member is mounted, a yoke pivotally supported within the housing cavity and defining at least one arm which extends into engagement with a respective rod, wherein the lead screw engages the yoke at said location within the housing cavity such that linear motion of the lead screw pivots said yoke relative to the housing to thereby control position of the annular wall member. The yoke may be pivotally mounted on a shaft supported by the housing. The shaft may either rotate with the yoke or maybe non-rotatably supported by the housing. In the latter case, the yoke may float on the shaft.

The yoke may include at least one arm extending in a radially direction relative to the axis of the yoke shaft and which engages the lead screw. For instance, the yoke arm may engage the lead screw nut. An engagement member may be pivotally connected to the screw nut and slidingly engaged with each arm for sliding movement relative to the arm in a direction at an oblique angle to the screw shaft axis. The oblique angle may for instance be generally parallel to a radial line extending from the yoke shaft. The engagement member may be slidingly received within a slot defined by a respective yoke arm. The slot may be defined in the end of each arm and have an open end. The engagement member may have at least one substantially flattened surface which slidingly engages with a surface defined by the yoke arm to prevent rotation of the member relative to the yoke arm.

The lead screw shaft may extend at an oblique angle to the turbine axis, or alternatively generally parallel to the turbine wheel axis.

The lead screw shaft preferably has a thread with a single start.

Other advantageous and preferred features of the invention will be apparent from the following description.

Specific embodiments of the present invention will now be described, by way of example only, with reference to the accompanying drawings, in which.

Figure 1:
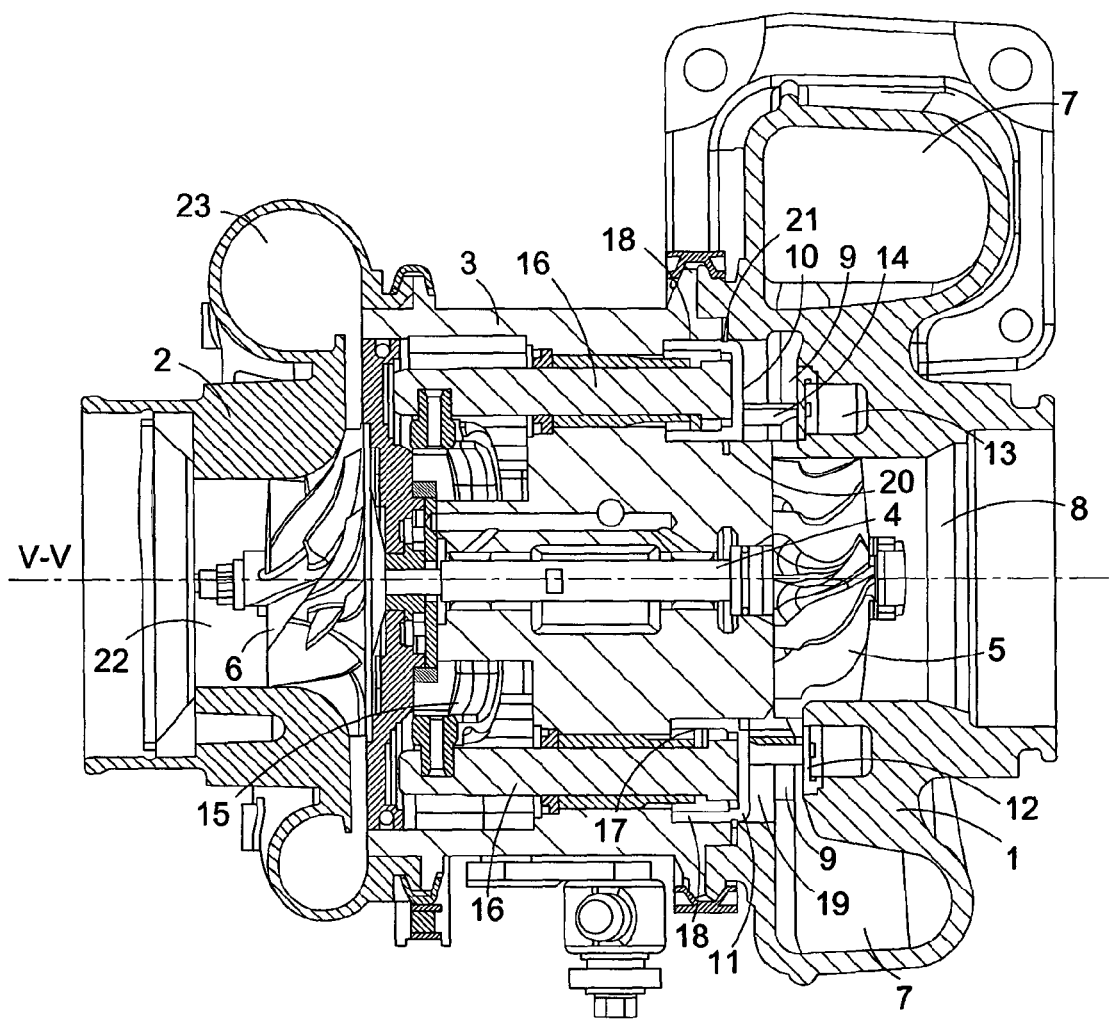
FIG. 1 is an axial cross-section through a known variable geometry turbocharger.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4*a* on bearing assemblies located in the bearing housing 3.

The turbine housing 1 defines an inlet volute 7 to which gas from an internal combustion engine (not shown) is delivered.

The exhaust gas flows from the inlet chamber 7 to an axial outlet passageway 8 via an annular inlet passageway 9 and turbine wheel 5. The inlet passageway 9 is defined on one side by the face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552 referred to above. An actuator (not shown) is operable to adjust the position of the nozzle ring 11 via an actuator output shaft (not shown), which is linked to a yoke 15. The yoke 15 in turn engages axially extending rods 16 that support the nozzle ring 11. Accordingly, by appropriate control of the actuator (which may for instance be pneumatic or electric), the axial position of the rods 16 and thus of the nozzle ring 11 can be controlled.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet chamber 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown). The speed of the turbine wheel 5 is dependent upon the velocity of the gas passing through the annular inlet passageway 9. For a fixed rate of mass of gas flowing into the inlet passageway, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

Figure 2:
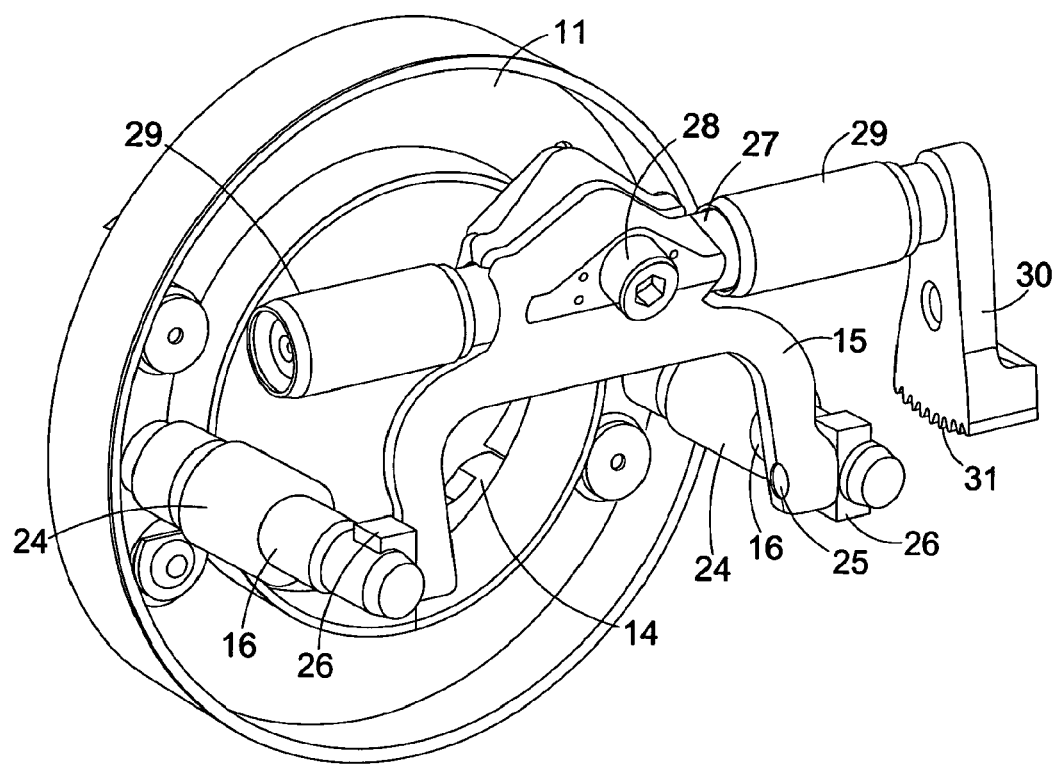
FIG. 2 is an enlarged perspective view of components of the nozzle ring actuator assembly of the turbocharger of FIG. 1.

FIG. 2 illustrates components of a nozzle ring and nozzle ring actuator assembly of the general type shown in FIG. 1. These components are shown removed from the turbocharger for clarity. Specifically, FIG. 2 shows the back side of the nozzle ring 11 (facing away from the turbine inlet) supported on rods 16 mounted within bushes 24 for movement parallel to the axis of the turbocharger. Each arm of yoke 15 is connected to a respective rod 16 via a pivot pin 25 (only one of which is visible in FIG. 2) and sliding block 26. Each pivot pin 25 pivotally connects an end of an arm of the yoke 15 to a respective sliding block 26 which is received within a slot defined in the respective support rod 16. The yoke 15 is clamped to a yoke shaft 27 by bolt 28. The yoke shaft 27 is rotatably supported within bearings 29 which are mounted in the bearing housing wall (the bearing housing is not shown in FIG. 2). One end of the yoke shaft 27 is formed with a crank 30 appropriate for connection to an actuator. In the example illustrated in FIG. 2 the crank 30 is a sector gear suitable for connection to a gear wheel assembly driven by a rotary electric actuator (not shown).

In operation, rotary motion of the electric actuator is transferred to the crank 30 which rotates the yoke shaft 27 about its axis within the bushes 29. This in turn rotates the yoke 15 causing the pins 25 to describe an arc of a circle. This causes the blocks 26 to move axially with the rods 16, whilst sliding within the slots to accommodate off axis movement of the pins 25. The nozzle ring 11 is thereby moved along the axis of the turbocharger by rotation of the yoke 15.

Figure 3:
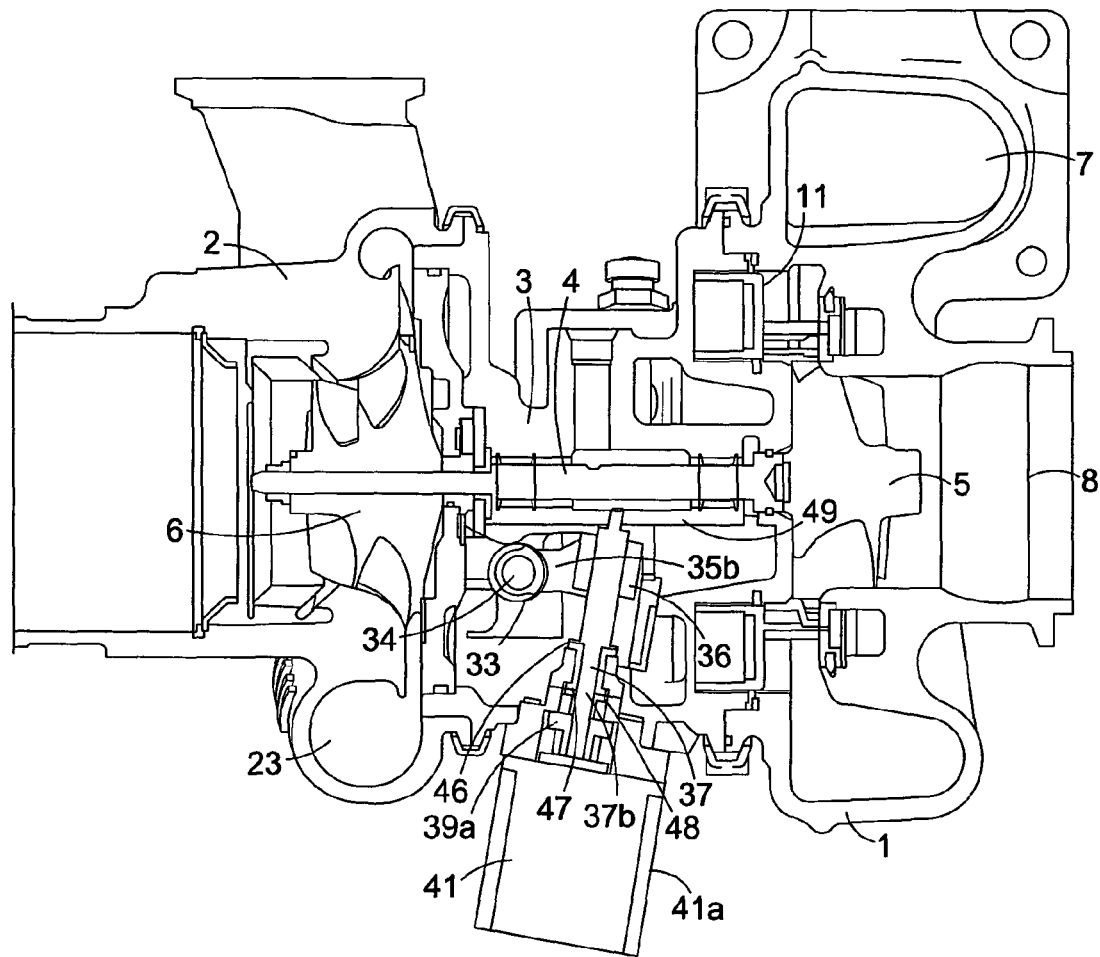
FIG. 3 is an axial cross section through a variable geometry turbocharger in accordance with the present invention.
Figure 4:
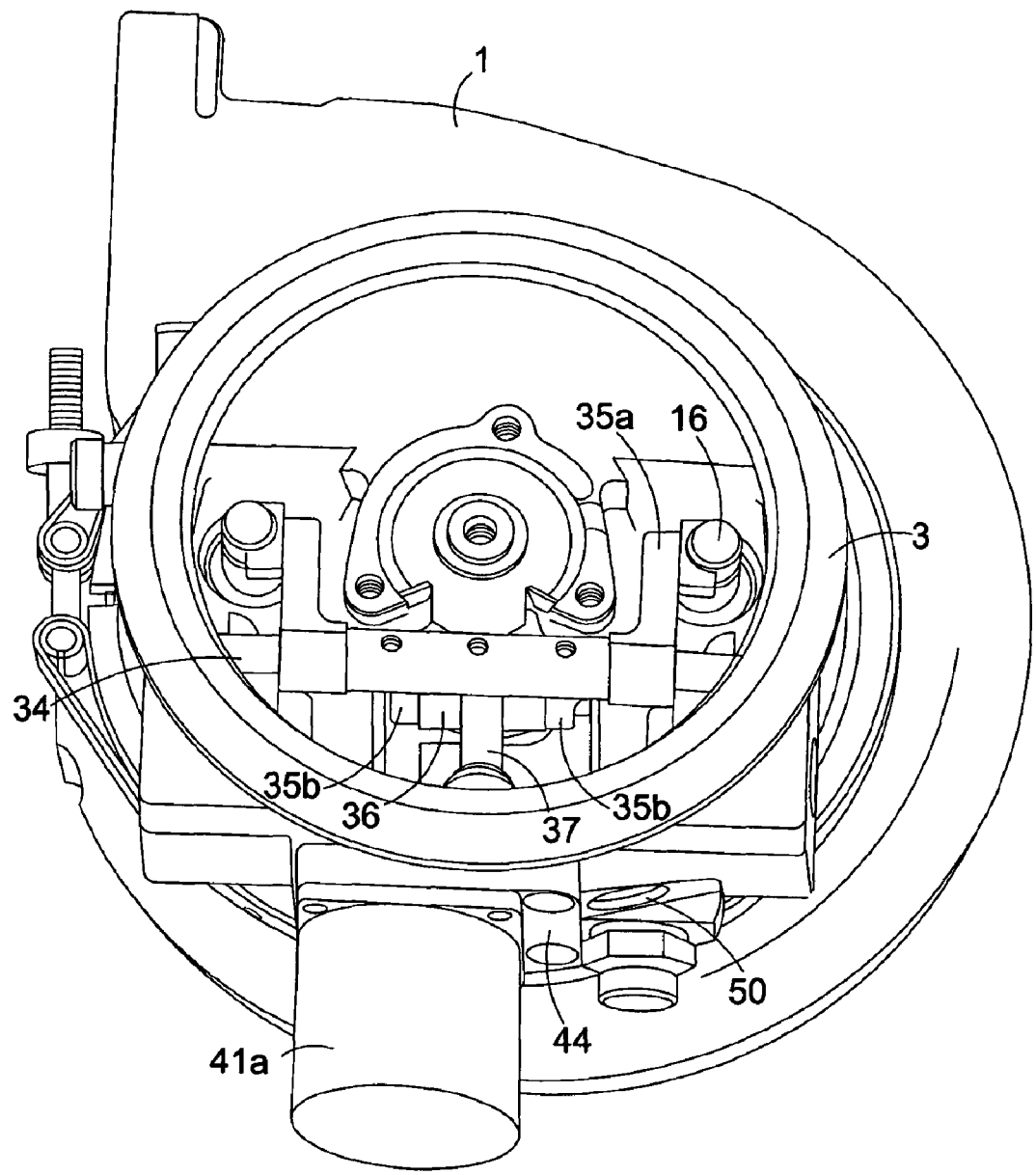
FIG. 4 is a perspective end view of part of the variable geometry turbocharger of FIG. 3.
Figure 5:
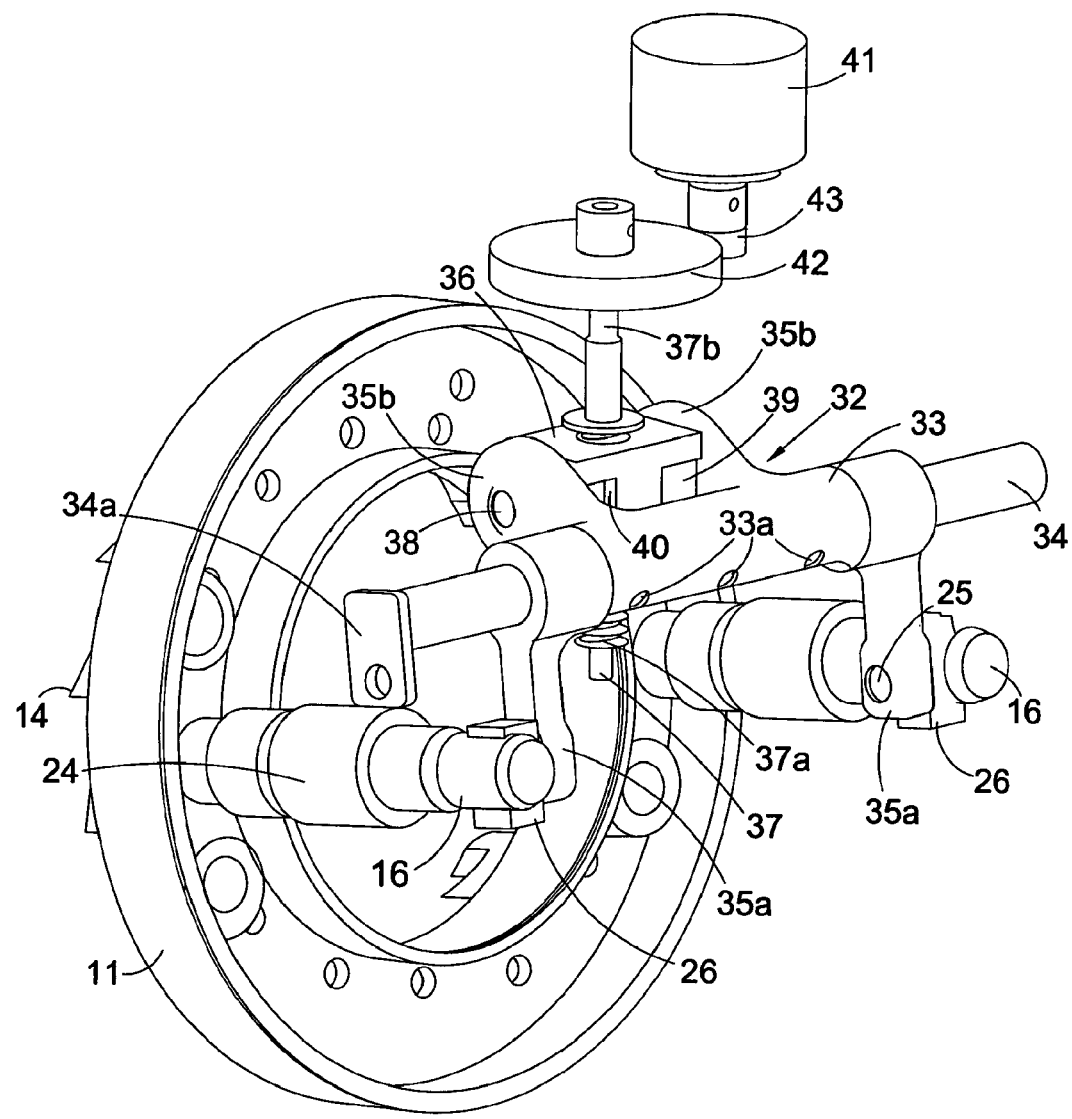
FIG. 5 is an enlarged perspective view of components of the nozzle ring actuator assembly of the turbocharger of FIGS. 3 and 4.
Figure 6:
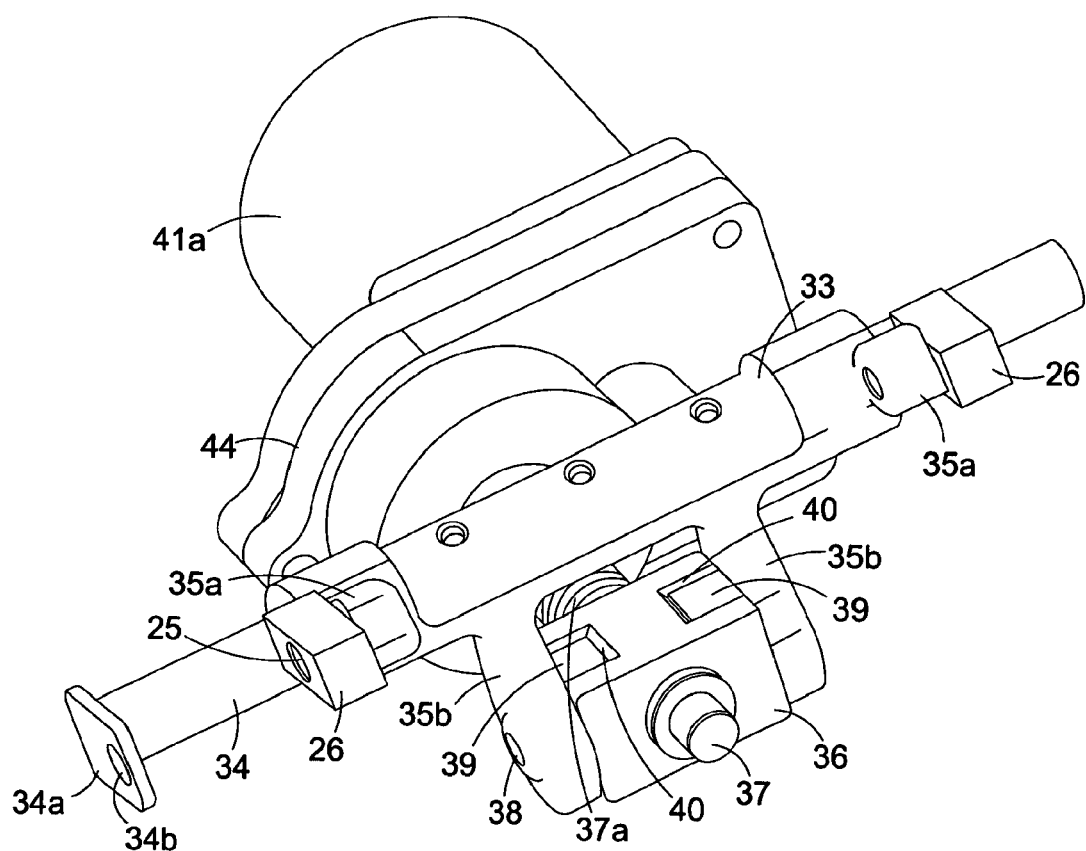
FIG. 6 is another enlarged perspective view of components of the nozzle ring actuator assembly of the turbocharger of FIGS. 3 and 4.
Figure 7:
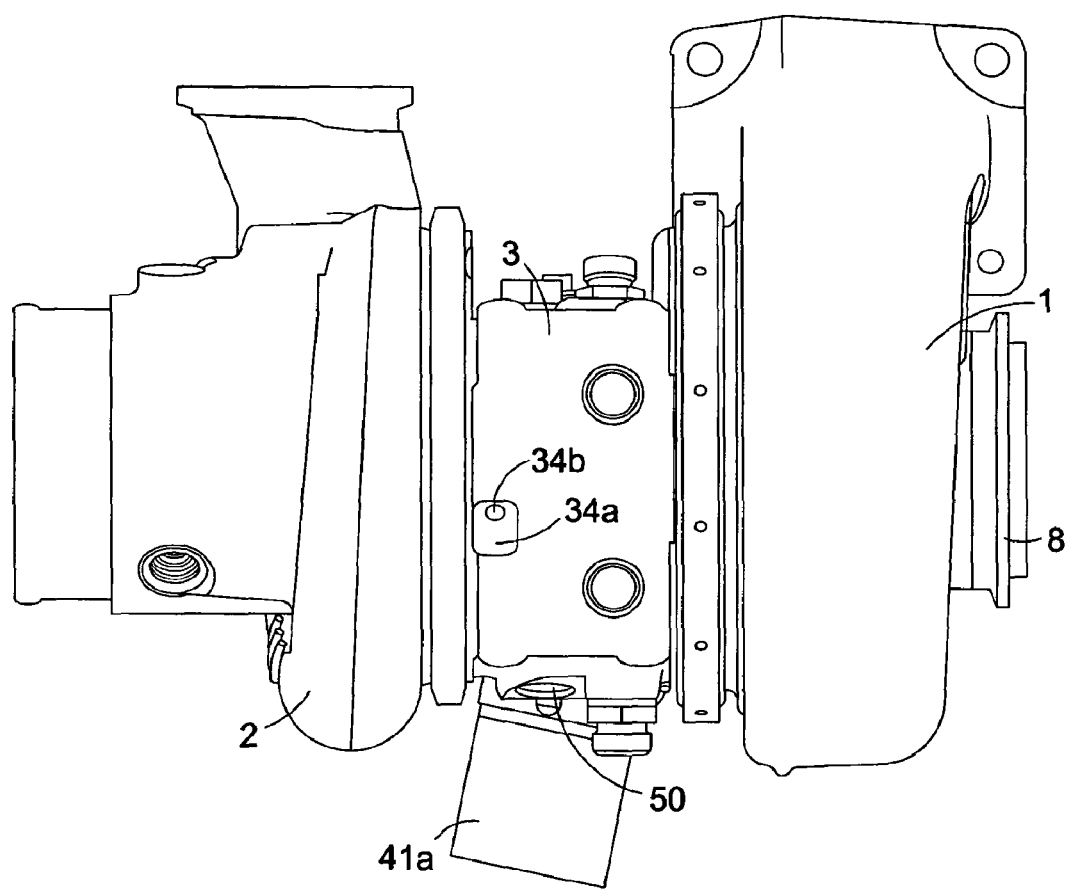
FIG. 7 is a side view of the turbocharger of FIG. 3.

An embodiment of the present invention will now be described with reference to FIGS. 3 to 7. FIG. 3 is an axial cross-section through a turbocharger in general corresponding to the turbocharger of FIG. 1 but incorporating a nozzle ring actuator assembly according to the present invention. Components equivalent to those shown in FIG. 1 are identified using the same reference numerals. The cross-section on FIG. 3 is however taken on a plane 90° to the plane of the cross-section of FIG. 1 so that, for instance, the guide rods 16 are not visible in FIG. 3. FIG. 4 is an end elevation of the turbocharger of FIG. 3 with the compressor housing and the compressor components removed together with the turboshaft and bearing assemblies. This figure thus reveals details of the actuator assembly according to the present invention which is visible through the open compressor end of the bearing housing 3. FIGS. 5 and 6 are expanded views of the nozzle ring (FIG. 5 only) and components of the actuator assembly according to the present invention shown removed from the turbocharger for clarity. FIG. 7 is an exterior side view of the assembled turbocharger of FIG. 3.

The nozzle ring actuator assembly comprises an electric motor driven lead screw which engages a modified yoke which in turn engages the nozzle ring support rods 16. In more detail, a yoke 32 including a cylindrical body 33 is mounted for rotation within the bearing housing oil cavity on a cross-shaft 34 which extends through the body 33, and is mounted to the bearing housing 3 at either end. The shaft 34 is inserted through a bore in the bearing housing wall and fixed against rotation by securing a shaft end flange 34a to the housing. The opposite end of the shaft may be received within an appropriate support formation provided internally of the bearing housing. The location of the shaft end flange 34a external of the bearing housing is visible in FIG. 7 and may be secured in position by inserting a bolt or the like through a hole 34b provided in the flange 34a and into a threaded bore provided in the housing wall. The yoke 32 is lubricated on the shaft 34 by oil which splashes within the bearing housing oil cavity and reaches the shaft through oil supply holes 33a provided through the yoke body 33.

The yoke 32 has a first pair of arms 35a extending radially from the yoke body 33, each of which engages an end of a respective nozzle ring support rod 16 via a pin 25 and sliding block 26 in the same way that the yoke 15 of FIG. 2 engages the nozzle ring support rods 16. The yoke 32 has a second pair of arms 35b extending from the yoke body 33 that are more closely spaced than the yoke arms 35a and which extend away from the body 33 in a different radial direction to the arms 35a. In the illustrated example the angle between the arms 35a and 35b (subtended at the cross-shaft axis) is approx 100°.

The yoke arms 35b are pivotally connected to a lead screw nut 36 which is threaded on a threaded portion 37a of a lead screw shaft 37. The pivotal engagement is provided by way of pins 38 which extend from each arm 35b into respective slider blocks 39 which are received within slots 40 defined in the lead screw nut 36. The pins 38 are fixed within the arms 38 and are pivotally received within the sliding blocks 39 which are constrained against movement relative to the lead screw nut 36 in the direction of the axis of the lead screw shaft 37, but are free to slide within the lead screw slots 40 in a direction generally perpendicular to the axis of the lead screw shaft 37. This engagement assembly operates in substantially the same way as the sliding block engagement between the yoke arms 35a and the nozzle ring support rod 16.

An electric motor 41 housed in a housing 41a is provided to rotate the lead screw shaft 37. The lead screw shaft 37 may be directly driven by the motor or, as illustrated, driven via a spur gear 42 secured to one end of the lead screw shaft and engaging a pinion 43 driven by the motor (the detail of the gear teeth is omitted for simplicity).

The spur gear 42 and pinion 43 are located in a gear housing 44 which is bolted to the turbine housing 3. The motor housing 41 is mounted on the gear housing 44 so that the motor shaft extends into the gear housing 44. The gear housing 44 has a generally cylindrical portion 45 which extends into the interior of the bearing housing. A non-threaded end 37b of the lead screw 37 extends into the gear housing 44 through back to back thrust bearings 46 and 47, a thrust collar 48 (held captive on the lead screw shaft 37) and an oil seal 39a which surrounds the screw shaft 37 between the thrust collar 48 and the spur gear 42.

In operation the motor 41 is controlled to rotate the lead screw shaft 37. The lead screw nut 36 is secured against rotation relative to the yoke by the sliding blocks 39 which engage the nut 36 within the slots 40. The lead screw shaft 37 is free to rotate but it constrained against movement along its axis. Accordingly, rotation of the lead screw shaft 37 produces linear movement in the lead screw nut 36 in the direction of the axis of the screw shaft 37. This linear motion effects rotation of the yoke 32 about the shaft 34. Although the ends of the yoke arms 35b transcribe an arc of a circle, off axis motion is accommodated by the sliding blocks 39 which are free to slide within the screw nut 36 as described above.

As the yoke 32 rotates about the shaft 34 the yoke arms 35a cause the support rods 16, and thus nozzle ring 11, to move back and forth in the direction of the axis of the turbocharger (depending on the direction of rotation of the motor 41) to thereby vary the turbine inlet width.

Although there are no significant off axis forces on the lead screw shaft 37, the end of the lead screw shaft 37 remote from the motor 41 can nevertheless be supported to improve stability. For instance, in the illustrated embodiment of the invention (as best seen in FIGS. 3 and 7) the lead screw shaft lies in a plane containing the turbocharger shaft axis, and the end of the lead screw is rotatably supported by a central turbocharger shaft casing 49 within which the turbocharger shaft 4 rotates.

Figure 8:
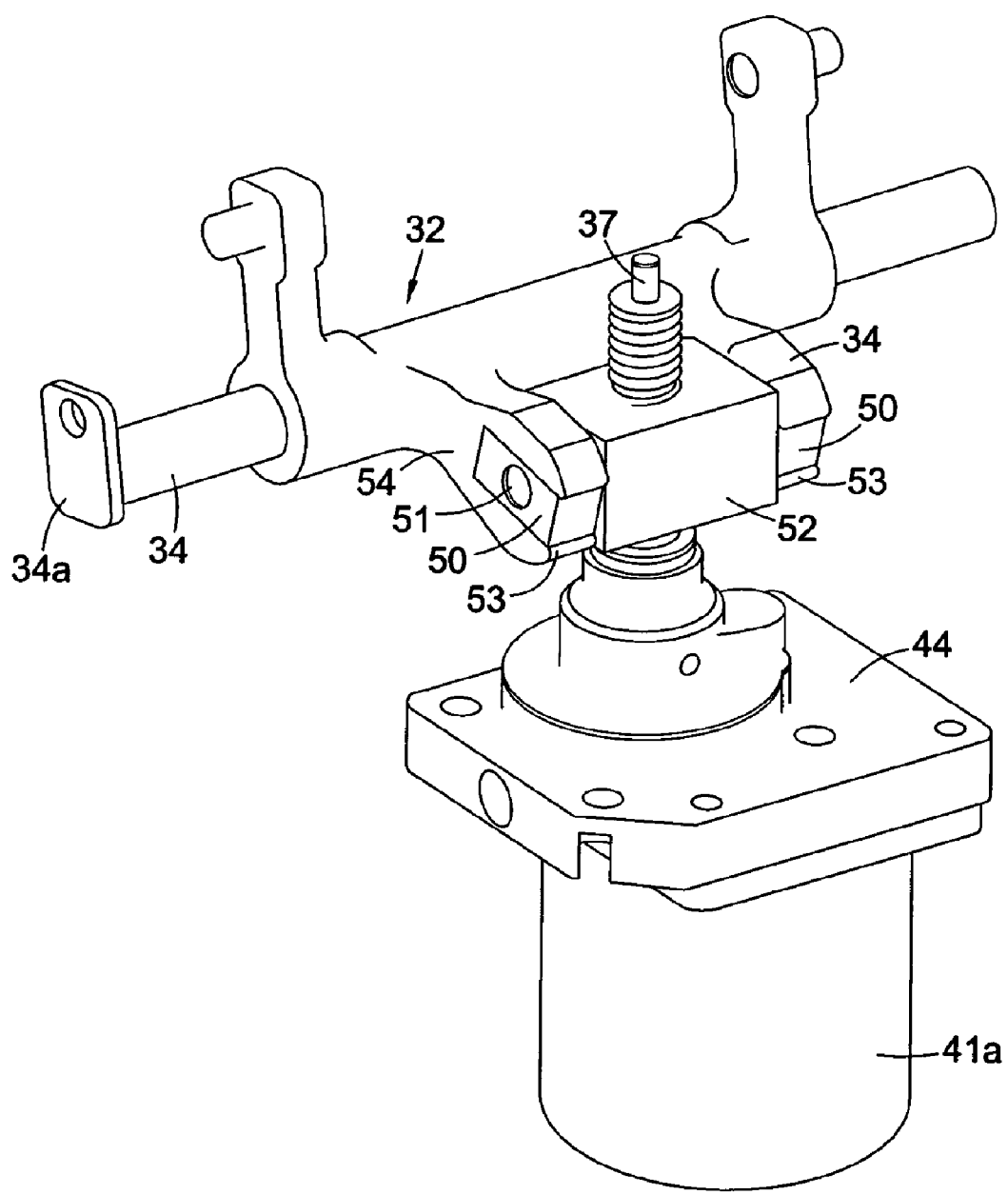
FIGS. 8 and 9 illustrate components of an alternative embodiment of the present invention.
Figure 9:
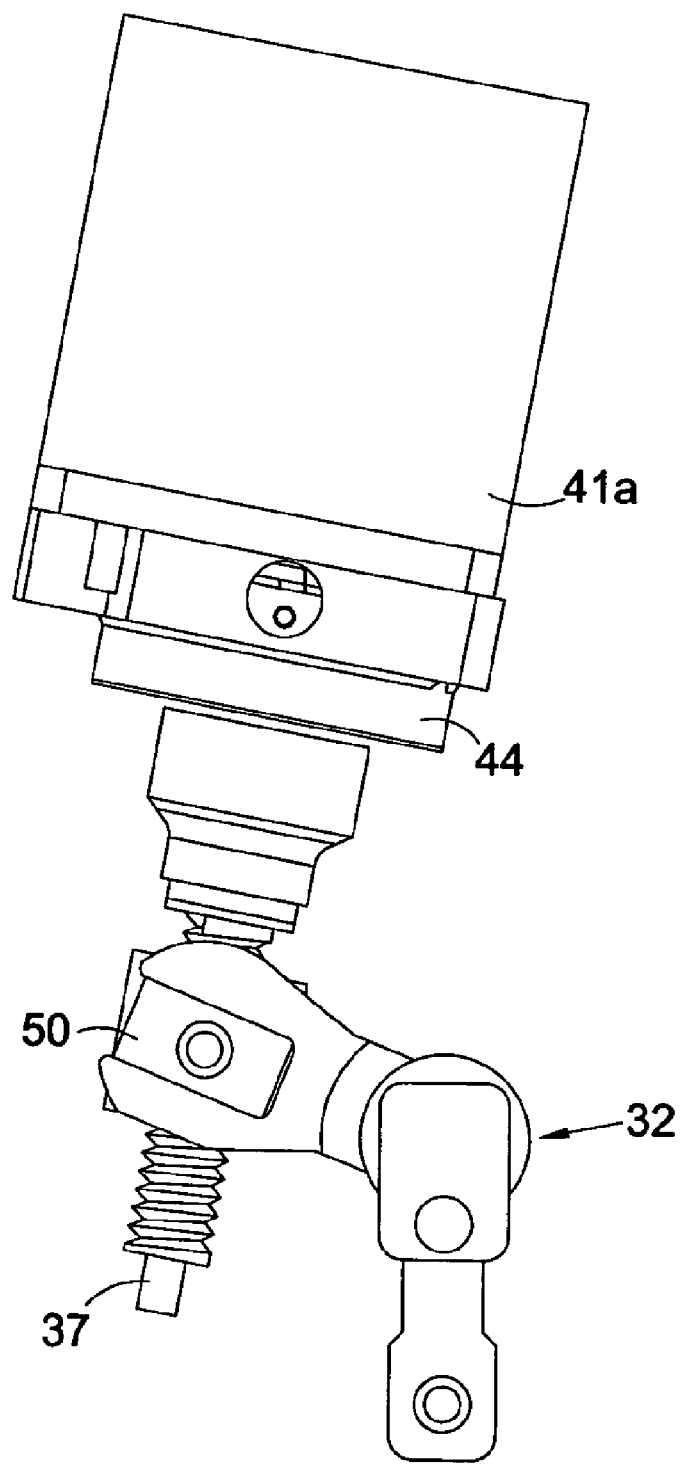

An alternative configuration for the lead screw nut and the manner of its engagement with the yoke is illustrated in FIGS. 8 and 9, which show details of the lead screw actuator removed from the turbocharger for clarity. Where appropriate reference numerals used in FIGS. 5 and 6 are also used in FIGS. 8 and 9. In this alternative embodiment the sliding blocks 50 are pivotally mounted on pins 51 which are fixed within a modified lead screw nut 52. The sliding blocks 50 are slidlingly received within open slots 53 provided in the end of each yoke arm 54 (the arms 54 correspond to the arms 35b of the embodiment of FIGS. 5 and 6). With this arrangement the nut 52 is once again constrained against rotational movement relative to the screw shaft 37 but is free to move axially along the screw shaft 37 as the screw shaft 37 rotates. The blocks 50 are however free to slide in the slots 53 allowing the yoke arms 54 to describe an arc as the nut 52 moves. In this way, linear movement of the nut 52 pivots the yoke 32 about the shaft 34 to control the position of the nozzle ring (not shown). This configuration avoids putting any tilting load on the nut, and hence no bending load on the screw, and will minimise friction and wear at the interface of the nut and screw.

Figure 10:
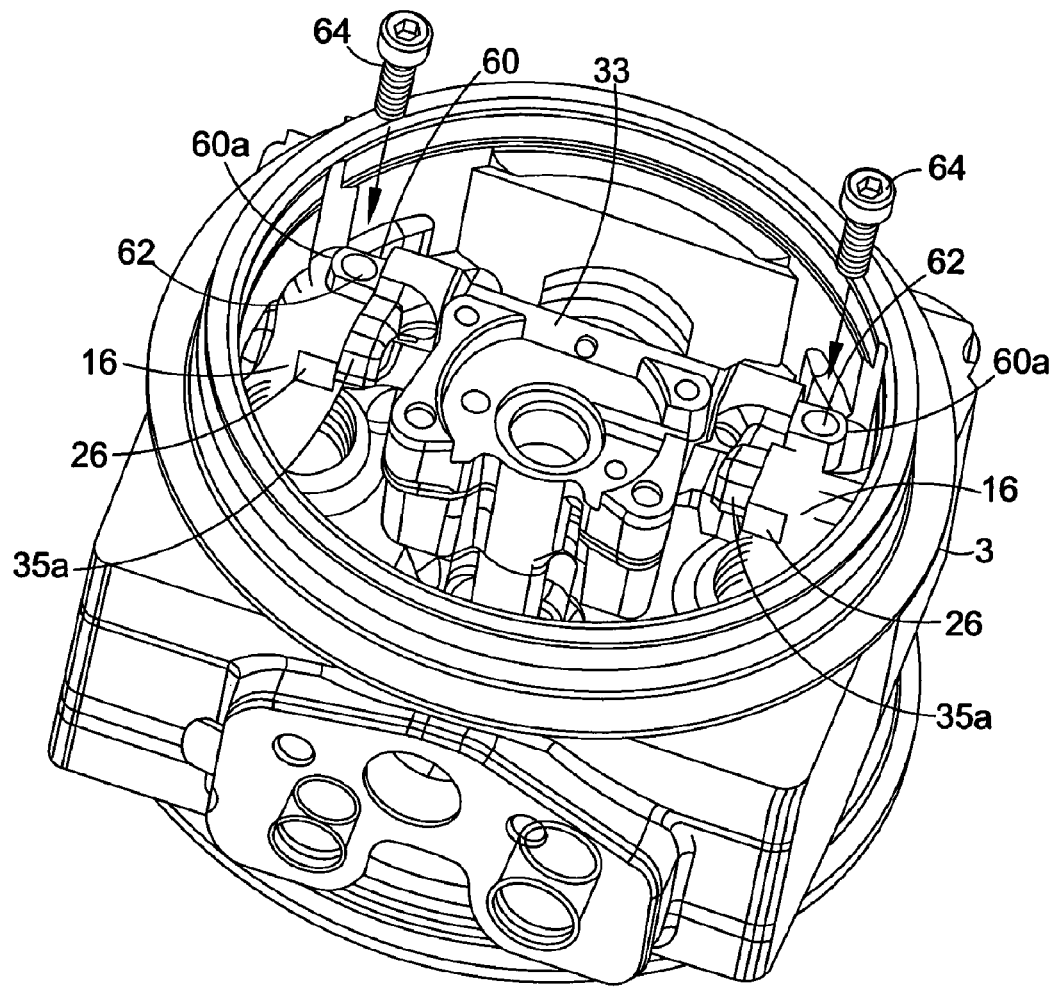
FIGS. 10 and 11 illustrate components of a further alternative embodiment of the present invention.
Figure 11:
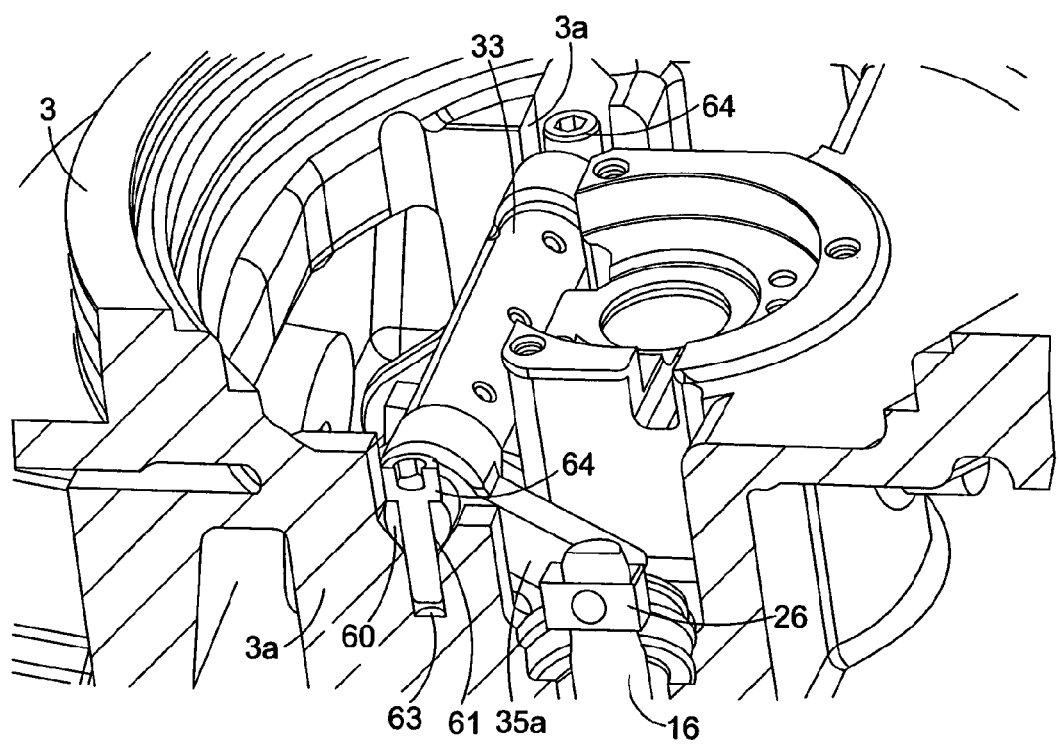

With the above described embodiments of the invention the shaft 34 extends through a bore in the housing wall. In other embodiments of the invention the shaft may be secured entirely within the bearing housing 3 to avoid the need to provide any seal in the bearing housing wall to accommodate passage of the shaft 34. An example of such an embodiment is shown in FIGS. 10 and 11. These show a modification of the embodiment of FIGS. 3 to 7 and accordingly corresponding features are identified by the same reference numerals as used in FIGS. 3 to 7. FIG. 10 is an end view of the turbocharger bearing housing 3 with the turbocharger compressor components removed, together with the turbocharger shaft and bearing assemblies, to reveal details of the modified actuator cross-shaft 60.

The bearing housing 3 includes internal walls 3a each provided with a "v" shaped notch 61 to provide a seat for a respective end of the cross-shaft 60. Each end of the cross-shaft 60 includes a flattened portion 60a provided with a bolt hole 62. A blind threaded bore 63 is provided in each housing wall 3a, extending into the housing wall from the bottom of the "v" shaped notch 61. The shaft is secured in position by bolts 64 which pass through the shaft bolt holes 62 and are threaded into the bores 63 provided in the housing wall portions 3a. For assembly, the shaft 60 may simply be inserted into the open end of the bearing housing 3 and bolted in position. The "v" shape of the shaft seats 61 ensures that the shaft centres as the bolts 64 are tightened so that the shaft 60 is correctly aligned. With this embodiment of the invention there is no need to provide any oil seal around the shaft as the shaft does not pass through the bearing housing wall. Machining and assembly required to correctly position the shaft is also simplified.

Since with the present invention the lead screw extends into the bearing housing, and engages the yoke at a location within the bearing housing, the overall space requirement of the actuator assembly is reduced. As can be seen in FIGS. 3 to 6, only the motor housing 41, and part of the gear housing 43, are external to the bearing housing 3. The yoke and lead screw can be orientated so that the motor housing 41a extends beneath the turbocharger (as it would be mounted in an engine) which is an area where space is customarily left in any event for the gravity oil drain 50 from the turbocharger bearing housing 3. It is a simple matter to move the oil drain 50 off centre to accommodate the actuator assembly.

Another advantage of the present invention is that the lead screw shaft 37 and nut 36, and the pivotal connections between the lead screw nut 36 and the yoke 32 and between the yoke body 33 and the yoke shaft 34, are all located in oil drain cavity within the bearing housing 3 and so are washed with oil splashing from the conventional turbocharger bearings which both lubricates and helps cool these actuator assembly components. The actuator assembly components are also thus housed away from exposure to dirt in the environment external to the bearing housing 3. In the illustrated embodiment of the invention the oil seal 39a seals the gears (which are greased) from the bearing housing oil supply. In an alternative embodiment this seal could be replaced by an oil seal surrounding the motor shaft so that the gears are also exposed to the oil supply from the bearing housing and do not need to be greased.

Securing the gear and motor housings to the underneath of the turbocharger bearing housing 3, i.e. to the bottom of the bearing housing which is most cooled by the oil flow within the bearing housing, ensures that heat transfer to the motor is reduced.

The lead screw actuator according to the present invention has advantages over a conventional rotary electric actuator that may for instance be incorporated in the type of actuator assembly illustrated in FIG. 2. For instance, in a known implementation of that type of prior art actuator assembly, a geared-down DC electric motor is used to rotate the yoke shaft (via the sector gear illustrated). The motor needs to turn of the order of eight full rotations in order to pivot the yoke shaft through approximately 30 degrees required to cover the whole range of movement of the nozzle ring. The motor is typically controlled in steps of the thirtieth of a revolution, so that total resolution of movement of the nozzle ring is 30×8=240 steps. With the actuator assembly according to the present invention the lead screw shaft is preferably formed with a single start screw thread with a sufficiently low helix angle to maximise the number of turns of the lead screw for a given stroke length of the nozzle ring. This increases the resolution with which the nozzle ring can be positioned. The resolution can for instance be readily doubled compared with the 240 step resolution mentioned above.

In addition, selecting an appropriately low helix angle for the screw thread ensures that the lead screw will not back-drive as a result of force transmitted to the lead screw from the nozzle ring. For instance, with a conventional DC rotary actuator motor as may be incorporated in the prior art actuator assembly of FIG. 2, continuous torque is required from the motor in order to maintain the nozzle ring in a fixed position against the gas forces applied to it. If the power to the motor is cut then the applied gas forces will drive the nozzle in the direction of the gas force, forcing open the nozzle ring until a physical stop point is reached (i.e. back-driving). The actuator assembly of the present invention will maintain a fixed position without any torque input from the motor. This reduces the duty cycle of the motor leading to less internal heat generation.

In view of the gearing that can be provided by the lead screw shaft, and in particular the relatively low gearing that may be obtained with a single start screw thread, fewer gears may be required between the motor and the lead screw shaft than might typically be required, for instance, in a link between an electric rotary actuator and the nozzle ring actuating mechanism of FIG. 2. Indeed, with the present invention gears may be eliminated entirely if the motor directly drives the lead screw shaft. This reduces the number of moving parts and the space requirement of the actuating mechanism.

The preferred single start lead screw thread of the present invention allows a lower helix angle that can for instance be obtained with a multi-start thread which reduces the torque requirement from the motor to move a given load on the actuator assembly. This facilitates use of a smaller motor reducing space requirements and heat generation. The low helix angle that may be achieved using a single start thread is also more effective at reducing back-drive than a multi-start thread.

Any electronics required to control the motor, and any position sensors and associated electronics that may be included, can be located at the motor which as mentioned above is cooled by the oil supply flow within the bearing housing 3 which reduces heat flow to the motor. For instance, no separate water cooling of the motor housing is required.

With the actuator assembly according to the present invention the motor and motor housing can be replaced without necessarily replacing any other components of the actuator assembly. Similarly, if necessary the lead screw and any gear assembly can be replaced without necessarily having to replace the motor.

It will be appreciated that the motor may be any suitable electric motor, including DC motors, stepper motors, induction motors etc.

It will be appreciated that whilst a single start thread on the lead screw is preferred, the present invention could be implemented using a multi-start thread, for instance if a different gear ratio is required. Similarly, it will be appreciated that the lead screw could have different configurations to that shown, and could for instance be a ball screw or roller screw. In the present context a lead screw comprises a lead screw shaft and lead screw nut. One of the nut and shaft is held against rotation (relative to a fixed frame of reference such as the turbocharger housing), and the other is held against linear movement in the direction on the axis of the shaft. Rotation of the axially fixed member thereby produces linear movement in the rotationally fixed member in the direction of the axis of the shaft. In the illustrated embodiment of the invention the screw shaft is rotated and it is the nut which moves along the axis of the shaft. It would be possible to construct alternative embodiments in which the lead screw nut is located at the motor end of the lead screw shaft and is rotated by the motor to produce linear movement in the lead screw shaft to move a yoke.

In the illustrated embodiment of the invention the lead screw 37 extends into the turbine housing at an angle of approximately 80 degrees to the axis of the turbocharger shaft. This is to some extent dictated by the design of the housing and an alternatively designed bearing housing might accommodate different angles of orientation. For instance, a smaller angle may be possible with an appropriately designed housing which might further reduce the space requirement of the actuation assembly external to the turbocharger. It will be appreciated that modifying the angle of orientation of the lead screw, and the location to which it extends within the bearing housing, may require modification to the design of the yoke, e.g. modification of the angle between the first and second pairs of yoke arms.

It will be further appreciated that the yoke may be structured differently to that shown in the illustrated embodiment of the invention. For instance, the yoke could be clamped to a shaft which rotates in journal bearings provided in the wall of the bearing housing in a similar manner to the rotating shaft of the prior art actuator assembly shown in FIG. 2. Similarly, the precise configuration of the lead screw nut 36 and its engagement with the yoke arms may vary from that indicated. For instance the yoke may have only a single second arm which engages a lead screw nut. It will further be appreciated that the yoke may be replaced entirely with another form of linkage between the lead screw and the nozzle ring.

In the illustrated embodiment of the invention the nozzle ring is mounted within a cavity provided in the bearing housing 3 and the yoke is located within the bearing housing oil drain cavity. In alternative embodiments of the invention, the nozzle ring and/or nozzle ring actuating assembly may be located in the turbine housing.

Whilst the invention has been illustrated in its application to the turbine of a turbocharger, it will be appreciated that the invention can be applied to variable geometry turbines in other applications.

Other possible modifications to the detailed structure of the illustrated embodiment of the invention will be readily apparent to the appropriately skilled person.

The invention claimed is:

1. A turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising:
- a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis, the lead screw engaging the gas flow control mechanism at a location within a housing cavity defined within said housing assembly; and
- wherein the housing assembly comprises a turbine housing, a compressor housing, and a bearing housing located between the turbine housing and the compressor housing, and wherein said housing cavity is defined within the bearing housing.

2. A turbocharger according to claim 1 wherein the lead screw shaft axis extends at an oblique angle to the turbine axis.

3. A turbocharger according to claim 1, wherein the threaded portion of the lead screw shaft has a thread with a single start.

4. A turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising:
- a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis, the lead screw engaging the gas flow control mechanism at a location within a housing cavity defined within said housing assembly;
- wherein a motor is provided to rotate one of the lead screw shaft and lead screw nut to produce linear motion in the other of the lead screw shaft and lead screw nut; and
- wherein the motor rotates the lead screw shaft and the lead screw nut engages the gas flow control mechanism.

5. A turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising:
- a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis, the lead screw engaging the gas flow control mechanism at a location within a housing cavity defined within said housing assembly;
- wherein a motor is provided to rotate one of the lead screw shaft and lead screw nut to produce linear motion in the other of the lead screw shaft and lead screw nut; and
- wherein the motor is mounted external to the housing assembly.

6. A turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising:
- a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis, the lead screw engaging the gas flow control mechanism at a location within a housing cavity defined within said housing assembly; and
- a linkage between said gas flow control mechanism and said lead screw, said lead screw engaging said linkage at said location within the housing cavity.

7. A turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising:
- a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis, the lead screw engaging the gas flow control mechanism at a location within a housing cavity defined within said housing assembly, wherein said gas flow control mechanism comprises a variable geometry mechanism for varying the size of the inlet passage, and wherein said inlet passage is annular and surrounds the turbine wheel, and said variable geometry mechanism includes an annular wall member which is displaceable in a direction parallel to the turbine axis to vary the width of the annular inlet passage between a first surface defined by the annular wall member and a second surface defined by the housing assembly; and
- a linkage comprising at least one axially displaceable rod on which the movable wall member is mounted, a yoke pivotally supported within the housing cavity and defining at least one arm which extends into engagement with a respective rod, wherein the lead screw engages the yoke at said location within the housing cavity such that linear motion of the lead screw pivots said yoke relative to the housing to thereby control position of the annular wall member.

8. A turbocharger according to claim 7, wherein the yoke is pivotally mounted on a shaft supported by the housing.

9. A turbocharger according to claim 8, wherein the yoke floats on said shaft which is non-rotatably supported by the housing.

10. A turbocharger according to claim 9, wherein opposite ends of said shaft are supported by internal walls of the housing assembly.

11. A turbocharger according to claim 10, wherein said walls are provided with a substantially "v" shaped notch or groove within which a respective end of the shaft sits, the shaft being secured in position by a bolt or the like inserted through a hole at a respective end of the shaft and into said housing wall at the bottom of the "v" shaped notch or groove.

12. A turbocharger comprising a turbine wheel mounted within a housing assembly for rotation about a turbine axis, a gas flow inlet passage upstream of said turbine wheel, and a gas flow control mechanism located within said housing assembly upstream of said turbine wheel and operable to control gas flow through said gas flow inlet passage, and an actuator assembly mounted to the housing assembly comprising:
- a lead screw including a lead screw shaft defining a lead screw axis, and a lead screw nut threadedly engaged on a threaded portion of the lead screw shaft, the lead screw being arranged so that rotation of one of said shaft and nut relative to the housing assembly produces linear movement in the other of said shaft and nut in the direction of the lead screw axis, the lead screw engaging the gas flow control mechanism at a location within a housing cavity defined within said housing assembly;
- said gas flow control mechanism comprising a variable geometry mechanism for varying the size of the inlet passage, said inlet passage being annular and surrounding the turbine wheel, said variable geometry mechanism including an annular wall member which is displaceable in a direction parallel to the turbine axis to vary the width of the annular inlet passage between a first surface defined by the annular wall member and a second surface defined by the housing assembly, and a linkage comprising at least one axially displaceable rod on which the movable wall member is mounted, a yoke pivotally supported within the housing cavity and defining at least one arm which extends into engagement with a respective rod, wherein the lead screw engages the yoke at said location within the housing cavity such that linear motion of the lead screw pivots said yoke relative to the housing to thereby control position of the annular wall member, the yoke being pivotally mounted on a shaft supported by the housing, the yoke floating on said shaft which is non-rotatably supported by the housing, opposite ends of said shaft being supported by internal walls of the housing assembly;
- wherein said walls are provided with a substantially "v" shaped notch or groove within which a respective end of the shaft sits, the shaft being secured in position by a bolt or the like inserted through a hole at a respective end of the shaft and into said housing wall at the bottom of the "v" shaped notch or groove.

13. A turbocharger according to claim 12, wherein the housing assembly comprises a turbine housing, a compressor housing, and a bearing housing located between the turbine housing and the compressor housing, and wherein said housing cavity is defined within the bearing housing.

14. A turbocharger according to claim 12, wherein a motor is provided to rotate one of the lead screw shaft and lead screw nut to produce linear motion in the other of the lead screw shaft and lead screw nut.

15. A turbocharger according to claim 14, wherein the motor rotates the lead screw shaft and the lead screw nut engages the gas flow control mechanism.

16. A turbocharger according to claim 14, wherein the motor is mounted external to the housing assembly.

17. A turbocharger according to claim 12, further comprising a linkage between said gas flow control mechanism and said lead screw, said lead screw engaging said linkage at said location within the housing cavity.

18. A turbocharger according to claim 12, where the threaded portion of the lead screw shaft has a thread with a single start.

* * * * *